(12) United States Patent
Michel

(10) Patent No.: US 8,562,009 B2
(45) Date of Patent: Oct. 22, 2013

(54) SUSPENSION ARRANGEMENT FOR A WHEEL SUSPENSION OF A MOTOR VEHICLE

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/441,395

(22) Filed: Apr. 6, 2012

(65) Prior Publication Data

US 2012/0256387 A1   Oct. 11, 2012

(30) Foreign Application Priority Data

Apr. 8, 2011 (DE) .......................... 10 2011 016 540

(51) Int. Cl.
*B60G 3/18* (2006.01)
(52) U.S. Cl.
USPC ....... 280/124.137; 280/124.149; 280/124.166
(58) Field of Classification Search
USPC ................. 280/124.135, 124.137, 124.149, 280/124.166
See application file for complete search history.

(56) References Cited

U.S. PATENT DOCUMENTS

| | | | |
|---|---|---|---|
| 2,991,088 A | 7/1961 | Kosicki | |
| 3,228,489 A | 1/1966 | Kosicki | |
| 3,831,970 A * | 8/1974 | Muller | 280/124.137 |
| 4,334,693 A * | 6/1982 | Huber | 280/124.143 |
| 4,796,911 A * | 1/1989 | Kuroki et al. | 280/5.511 |
| 5,496,055 A * | 3/1996 | Shibahata et al. | 280/124.141 |
| 6,382,649 B1 | 5/2002 | Albers et al. | |
| 6,467,783 B1 * | 10/2002 | Blondelet et al. | 280/124.106 |
| 6,530,586 B2 * | 3/2003 | Fader et al. | 280/124.106 |
| 7,322,591 B2 * | 1/2008 | Seki | 280/124.152 |
| 7,748,720 B2 * | 7/2010 | Germain | 280/5.506 |
| 7,798,508 B2 * | 9/2010 | Wettlaufer, Jr. | 280/124.152 |
| 7,931,281 B2 | 4/2011 | Maeda et al. | |
| 7,984,918 B2 | 7/2011 | Jung | |
| 2005/0179221 A1 * | 8/2005 | Yasui et al. | 280/5.506 |
| 2009/0008887 A1 * | 1/2009 | Buma | 280/5.511 |
| 2010/0013175 A1 | 1/2010 | Maeda | |
| 2010/0225083 A1 | 9/2010 | Jung | |
| 2011/0210525 A1 | 9/2011 | Michel | |
| 2011/0278812 A1 | 11/2011 | Ohletz et al. | |
| 2012/0049469 A1 | 3/2012 | Michel et al. | |

FOREIGN PATENT DOCUMENTS

| | | |
|---|---|---|
| DE | 199 33 432 A1 | 1/2001 |
| DE | 101 48 095 A1 | 4/2003 |
| DE | 10 2009 005 899 A1 | 7/2010 |

\* cited by examiner

*Primary Examiner* — Toan To
(74) *Attorney, Agent, or Firm* — Henry M Feiereisen LLC

(57) ABSTRACT

A suspension arrangement for a wheel suspension of a motor vehicle includes an output lever hinged directly or indirectly to a wheel control element and configured as a flexible spring of defined spring rate. A transverse torsion-bar spring acts on the output lever, with an actuator adjusting a pretension of the torsion-bar spring.

9 Claims, 2 Drawing Sheets

SUSPENSION ARRANGEMENT FOR A WHEEL SUSPENSION OF A MOTOR VEHICLE

CROSS-REFERENCES TO RELATED APPLICATIONS

This application claims the priority of German Patent Application, Serial No. 10 2011 016 540.1, filed Apr. 8, 2011, pursuant to 35 U.S.C. 119(a)-(d), the content of which is incorporated herein by reference in its entirety as if fully set forth herein.

BACKGROUND OF THE INVENTION

The present invention relates to a suspension arrangement for a wheel suspension of a motor.

The following discussion of related art is provided to assist the reader in understanding the advantages of the invention, and is not to be construed as an admission that this related art is prior art to this invention.

DE 10 2009 005 899 A1 describes a stabilizer for installation on a wheel suspension. The stabilizer has a torsion-bar spring which can be actuated by an actuator. The torsion-bar spring is constructed of a solid rod and a radially outer, tubular hollow rod, both made of spring steel and connected by a spline. A support spring as primary spring is arranged between a lower suspension arm and the body of the motor vehicle. Further provided is an output lever which is attached to the lower suspension arm of the wheel suspension. The output lever is of rigid configuration and has no influence on the overall spring constant of the system. This type of rotary actuator is inadequate for installation in vehicles, especially smaller vehicles which require a reduction of the overall spring stiffness, because a softer torsion-bar spring would have to be accompanied by a prolongation of the solid rod and the hollow rod. Such a prolongation is however unacceptable in view of the available tight space conditions in the area of the wheel suspension.

It would therefore be desirable and advantageous to provide an improved suspension arrangement which obviates prior art shortcomings and which is simple in structure and yet reliable in operation.

SUMMARY OF THE INVENTION

According to one aspect of the present invention, a suspension arrangement for a wheel suspension of a motor vehicle includes an output lever hinged directly or indirectly to a wheel control element and configured as a flexible spring of defined spring rate, a transverse torsion-bar spring acting on the output lever, and an actuator for adjusting a pretension of the torsion-bar spring.

In accordance with the present invention, the output lever which is connected to the torsion-bar spring is no longer rigid without spring characteristics but rather is configured as a flexible spring with defined spring rate. Thus, the torsion-bar spring is followed or superimposed in a simple manner by a flexible spring connected in series to lower the spring rate of the suspension arrangement and to reduce torsional stress of the torsion-bar spring. As a result, it is possible to use a torsion-bar spring of lesser diameter and weight.

According to another advantageous feature of the present invention, the torsion-bar spring may include a tube spring extending from the actuator towards a midsection of the motor vehicle and a solid rod in driving relationship with the tube spring. The nested torsion-bar assembly comprised of tube spring and solid rod type spring is thus expanded with the output lever as a third resilient component. As a result, the overall spring rate can be adjusted downwards while yet maintaining geometric dimensions, i.e. the length of the torsion-bar assembly. In addition, the rotary actuator can be installed even in smaller vehicles that require a reduction in the overall spring stiffness of the wheel suspension.

According to another advantageous feature of the present invention, the output lever may be configured as bending beam of same bending stress. As a result, the output lever can be made of optimum weight from spring steel with even stress distribution.

According to another advantageous feature of the present invention, the output lever may have a substantial horizontal orientation, with vertical coupling rods articulating the output lever to the wheel control element. Advantageously, the output lever has a cross section which can taper from an attachment point upon the torsion-bar spring to the coupling rods. The provision of the vertically oriented coupling rods further prevents the wheel control elements from applying torques that are generated during travel and may cause a tilting of the flexible spring.

According to another advantageous feature of the present invention, the output lever may have a frustoconical configuration. The output lever may be made of round spring steel or configured with a cross section having at least in part a rectangular configuration with vertical profile. The output lever may taper in height and/or width and can be best suited to the respective load profile.

According to another advantageous feature of the present invention, the output lever and the actuator can be positioned on the outside of a wheel, with the torsion-bar spring extending from the actuator in the form of a tube spring towards midsection of the vehicle and connected there in driving relationship with a solid rod which is configured to extend back through the actuator for direct or indirect connection with the output lever.

According to another advantageous feature of the present invention, the torsion-bar spring may be configured as a storage spring, and a support spring may be provided on the wheel suspension in parallel relation, wherein the support spring together with the torsion-bar spring and the output lever define an overall spring rate of the suspension arrangement which spring rate can be best suited to different vehicle types and vehicle weights.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
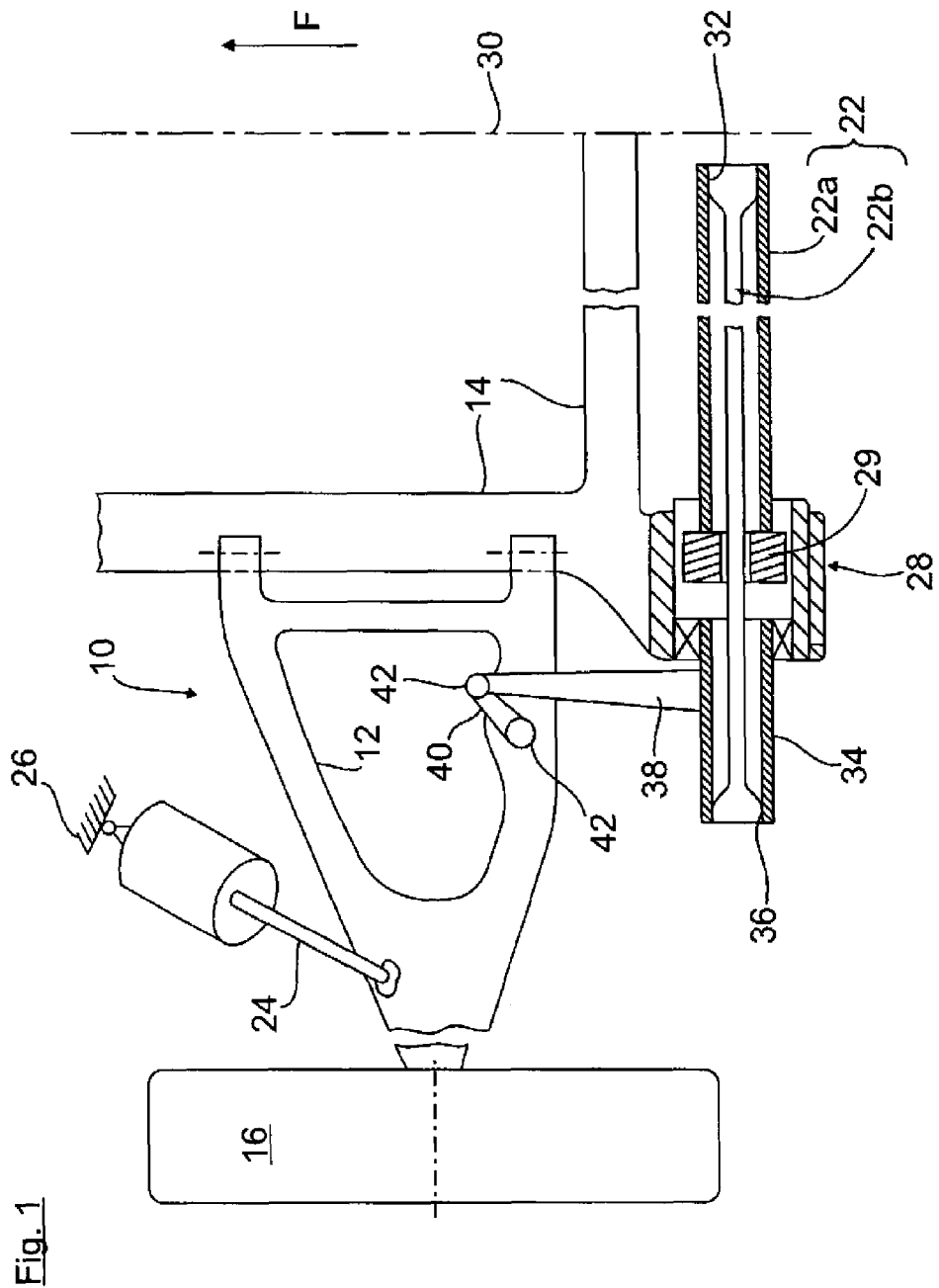
FIG. 1 is a plan view of a lower plane of a left-hand wheel suspension of a rear axle of a motor vehicle, having embodied therein a suspension arrangement in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a plan view of a lower plane of a left-hand wheel suspension of a rear axle of a motor vehicle, generally designated by reference numeral 10 and including a lower control arm 12 having one end hinged to a subframe 14, shown only in part, and another end hinged to a wheel carrier (not shown) for a rear wheel 16. The upper control arm or suspension arm to guide the wheel carrier is not visible here.

For convenience and sake of simplicity, much of the following description is made only in relation to left-hand wheel suspension 10, when in fact the two sides of the wheel suspension are mirror images of one another. Thus, although the wheel suspension will be described with respect to only the left-hand side, it will be understood that the same components of the wheel suspension are duplicated on the right-hand side of the wheel suspension.

The left-hand wheel suspension 10 shown in FIG. 1 includes a telescoping shock absorber 24 with support spring 20 separate thereof and shown only in the equivalent model of FIG. 2, and a suspension arrangement having a torsion-bar spring 22 extending in transverse vehicle direction and configured as a storage spring in a manner to be described further below.

The shock absorber 24 is supported on the lower control arm 12 and at the top to a body 26 of the motor vehicle, not shown in greater detail. The subframe 14 is also mounted to the body via vibration-isolating bearings.

The torsion-bar spring 22 includes a radially outer tube spring 22a which extends from an actuator 28, mounted to the subframe 14, inwards just shy of the shown vertical centerline 30 of the vehicle and is connected in driving relation with a solid rod 22b of spring steel via a plug connection 32 for example. The solid rod 22b extends radially inside the tube spring 22a towards the outer vehicle side and through the actuator 28 and is secured by a plug connection 36 to a guide bushing 34 which is arranged still further to the outside. The guide bushing 34 is rotatably mounted in the actuator 28 and supports an output lever 38 which projects forwards in radial relation to the control arm 12 in travel direction F of the motor vehicle and is pivoted to the control arm 12 via a mounting point 42 and a substantially vertically oriented coupling rod 40.

Figure 3:
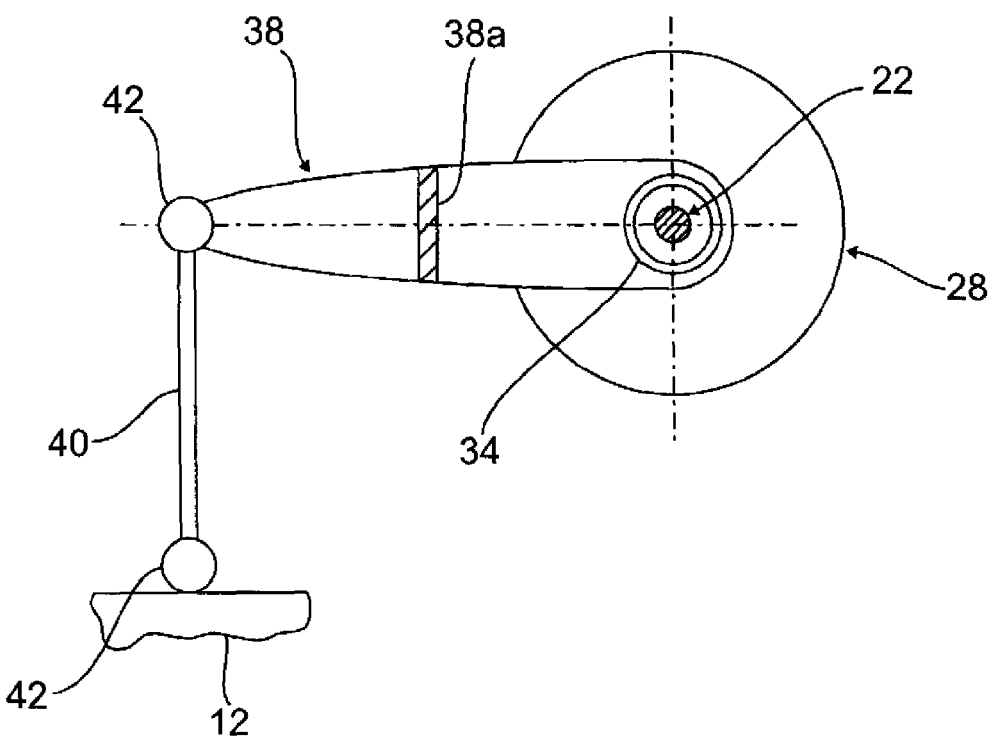
FIG. 3 is a side view of the suspension arrangement.

The actuator 28 is comprised in a manner shown only roughly and indicated by reference numeral 29 of a driving electric motor and a gear mechanism with high gear ratio (e.g. a harmonic drive or cycloid gear). The gear mechanism has an output element in driving relation with the tube spring 22a. The length of the effective torsion-bar spring 22 is determinative for the spring rate and is ascertained cumulatively by the length of the tube spring 22a from the actuator 28 to the plug connection 32 and the length of the solid rod 22b between the plug connections 32, 36. In addition, the output lever 38, as shown in FIG. 3, is configured as a flexible spring of spring steel with a spring rate which is superimposed in series connection with the torsion-bar spring 22.

The output lever 38 is preferably designed and configured as a bending support of same bending stress and has, by way of example, a rectangular cross section 38a with a greater width extending vertically, as can be seen. The cross section 38a continuously tapers from its attachment upon the guide bushing 34 to the coupling rod 42. Currently preferred is a configuration of the output lever 36 as a component of same bending beam.

Such a bending beam of same bending stress as output lever 38 is beneficial to attain optimum material use. Bending stress of same magnitude is encountered at each point of the cross section of the output lever 38. Material that is not necessary can thus be saved. The output lever 38 may also be viewed as a cantilever with one-sided fixed attachment and with single load on its end. As the adjusting force is conducted via the linkage at the end of the bending beam, no additional bending moments are introduced into the bending beam, i.e. output lever 38. The cross section of the output lever 38 may increase continuously towards the attachment point so that all cross sections of the beam are subjected to bending stress of same magnitude along its longitudinal extension. Such a beam of same bending stress provides best conditions for a force flux and saves unnecessary material use. Overall, the cross sectional profile of the output lever 38 is determined by the space conditions. For example, the output lever 38 may also be configured, as an alternative, of circular cross section such as frustoconical shape.

The electric motor of the actuator 28 is operable in both rotation directions and, when actuated accordingly using, for example, an electronic driving stability program in response to driving dynamic parameters, the prestress of the torsion-bar spring 22 and output lever 38, as storage springs, in relation to the parallel support spring 20 can be increased or reduced with respect to the basic design so as to modify the ride level or to resist any tendency to roll and/or pitch by the vehicle.

Figure 2:
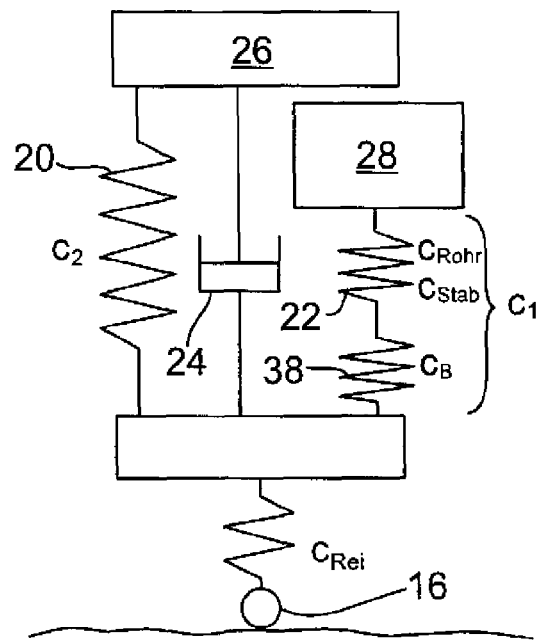
FIG. 2 is a representation of an equivalent model of the suspension arrangement of FIG. 1, depicting individual spring rates $c_1$ and $c_2$ which substantially determine the overall spring rate.

FIG. 2 shows by way of an equivalent circuit diagram the interaction of the suspension arrangement 20, 22 of the wheel suspensions 10 on both sides, using same reference numerals. As can be seen, the spring systems $c_2$ (support spring 20) and $c_1$ (torsion-bar spring 22 and flexible spring 38 in series connection) connected in parallel relationship between the body 26 of the motor vehicle and the wheel 16 and control arm 12 are effective and are determinative for the overall spring rate. For sake of completeness, FIG. 2 also shows the spring rate $c_{Rei}$ of the wheel 16 and its tire.

As a result of the series connection of the torsion-bar spring 22 with the output lever 38, configured as flexible spring, the spring rate $c_1$ as storage spring, controlled via the actuator 28 and associated therewith the overall spring rate $c_2+c_1$ can be decreased and advantageously best suited to the constructional situation at hand.

The overall; spring constant of the system depicted in FIG. 2 can be calculated in detail in accordance with the following formula:

$$\frac{1}{C_{ges}} = \frac{1}{C_{Rei}} + \frac{1}{C_{12}},$$

wherein $c_{12}=c_1+c_2$, and $$\frac{1}{C_1} = \frac{1}{C_{Tube}} + \frac{1}{C_{Rod}} + \frac{1}{C_B},$$

with
$C_{ges}$ overall spring constant of the system
$C_{Rei}$ spring constant of the tire 16

$C_1$ spring constant of the torsion spring (storage spring)
$C_2$ spring constant of the support spring 20
$C_{Tube}$ spring constant of the tube spring 22a
$C_{Rod}$ spring constant of the solid rod spring 22b
$C_B$ spring constant of the output lever 38

Accordingly, the spring stiffnesses of the vehicle tire with $c_{Rei}$, of the support spring 20 with $c_2$, and of the storage spring with $c_1$ are considered in the calculation. When calculating the overall spring constant $c_1$ of the storage spring 22, the output lever 38 configured as a flexible spring is further taken into account so as to establish a series connection comprised of the tube spring 22a, the solid rod spring 22b, and the output lever 38. Also considered in the above formula is therefore the third fraction 1:$c_B$ for the output lever 38 so that a reduced overall spring rate is realized for the storage spring in comparison to the prior art, after resolving the formula for $c_1$.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A suspension arrangement for a wheel suspension of a motor vehicle, comprising:
   an output lever hinged directly or indirectly to a wheel control element, said output lever being configured as a flexible spring of defined spring rate;
   a transverse torsion-bar spring acting on the output lever; and
   an actuator for adjusting a pretension of the torsion-bar spring.

2. The suspension arrangement of claim 1, wherein the torsion-bar spring is sized to extend to approximately a midsection of the motor vehicle.

3. The suspension arrangement of claim 1, wherein the output lever is configured as bending beam of same bending stress.

4. The suspension arrangement of claim 1, wherein the output lever has a substantial horizontal orientation, and further comprising vertical coupling rods for articulating the output lever to the wheel control element.

5. The suspension arrangement of claim 4, wherein the output lever has a cross section which tapers from an attachment upon the torsion-bar spring to the coupling rods.

6. The suspension arrangement of claim 1, wherein the output lever has a frustoconical configuration.

7. The suspension arrangement of claim 1, wherein the output lever has a cross section having at least in part a rectangular configuration with vertical profile.

8. The suspension arrangement of claim 1, wherein the output lever and the actuator are positioned to the outside of a wheel, with the torsion-bar spring including a tube spring extending from the actuator towards a midsection of the motor vehicle and a solid rod in driving relationship with the tube spring and configured to extend back through the actuator for direct or indirect connection with the output lever.

9. The suspension arrangement of claim 1, wherein the torsion-bar spring is configured as a storage spring, and further comprising a support spring provided on the wheel suspension in parallel relation, wherein the support spring together with the torsion-bar spring and the output lever define an overall spring rate.

* * * * *